A. K. KELLER.
BOTTLE SEAL ASSEMBLING MACHINE.
APPLICATION FILED APR. 18, 1912.
1,081,505.
Patented Dec. 16, 1913.
7 SHEETS—SHEET 1.
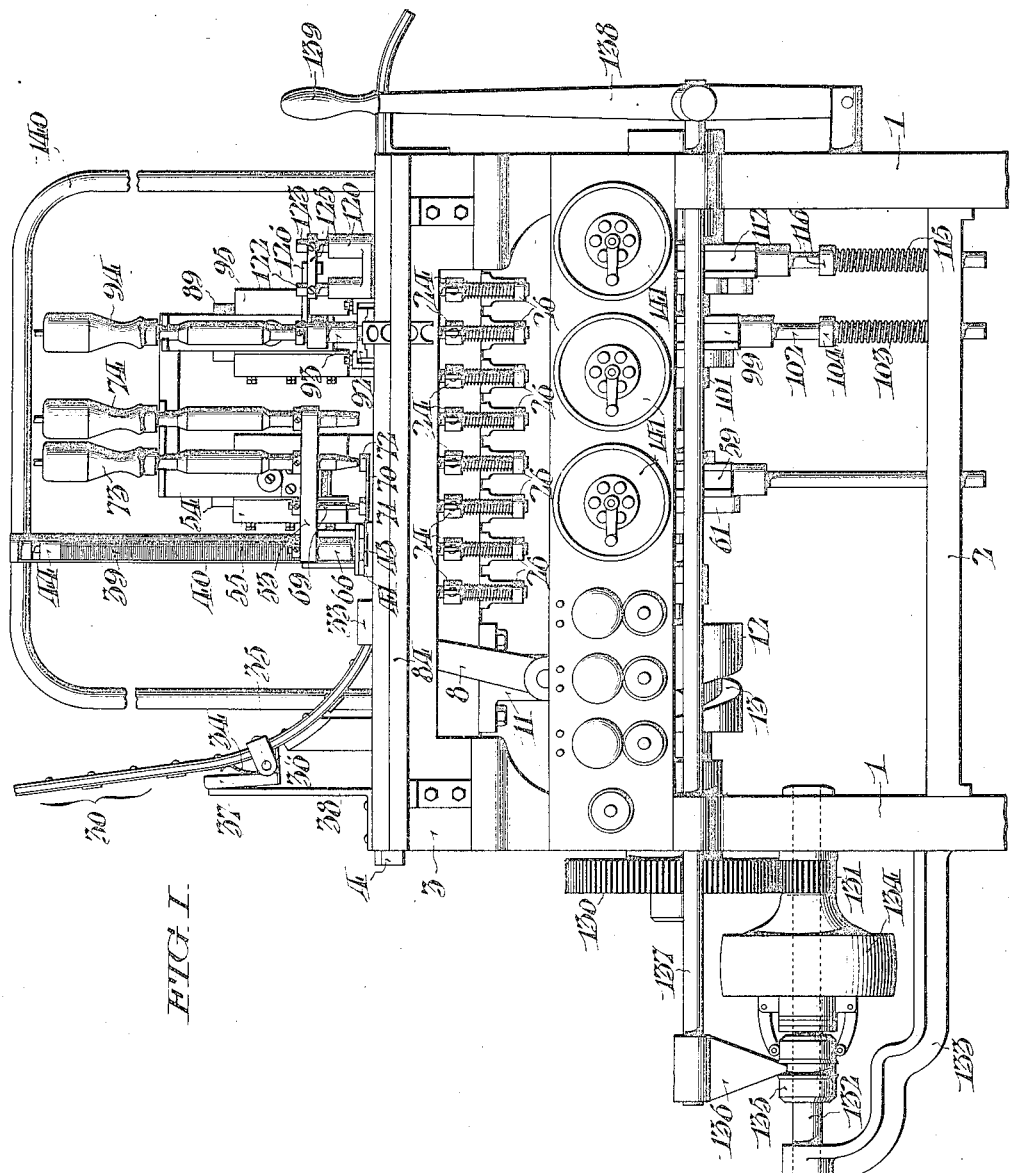
FIG. I.

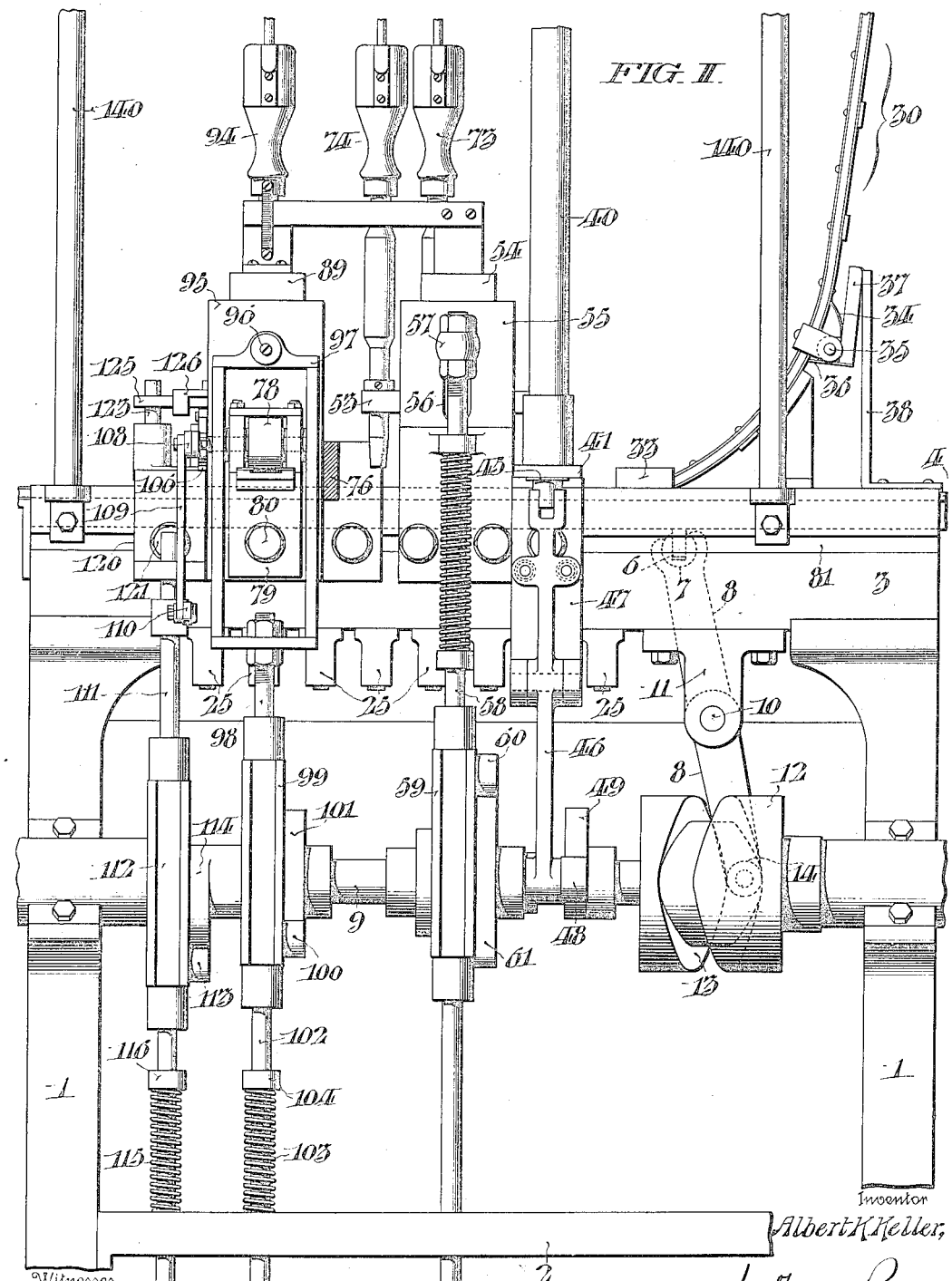

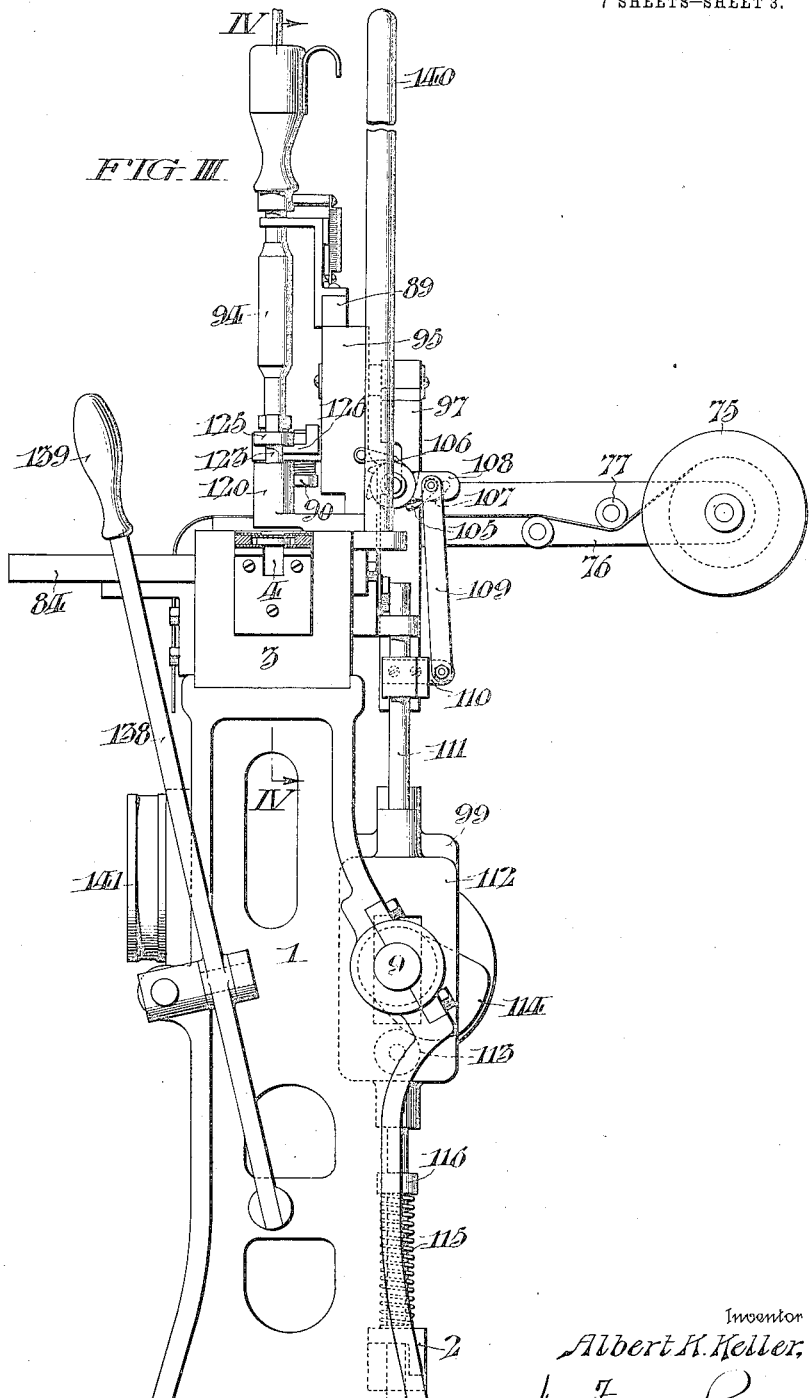

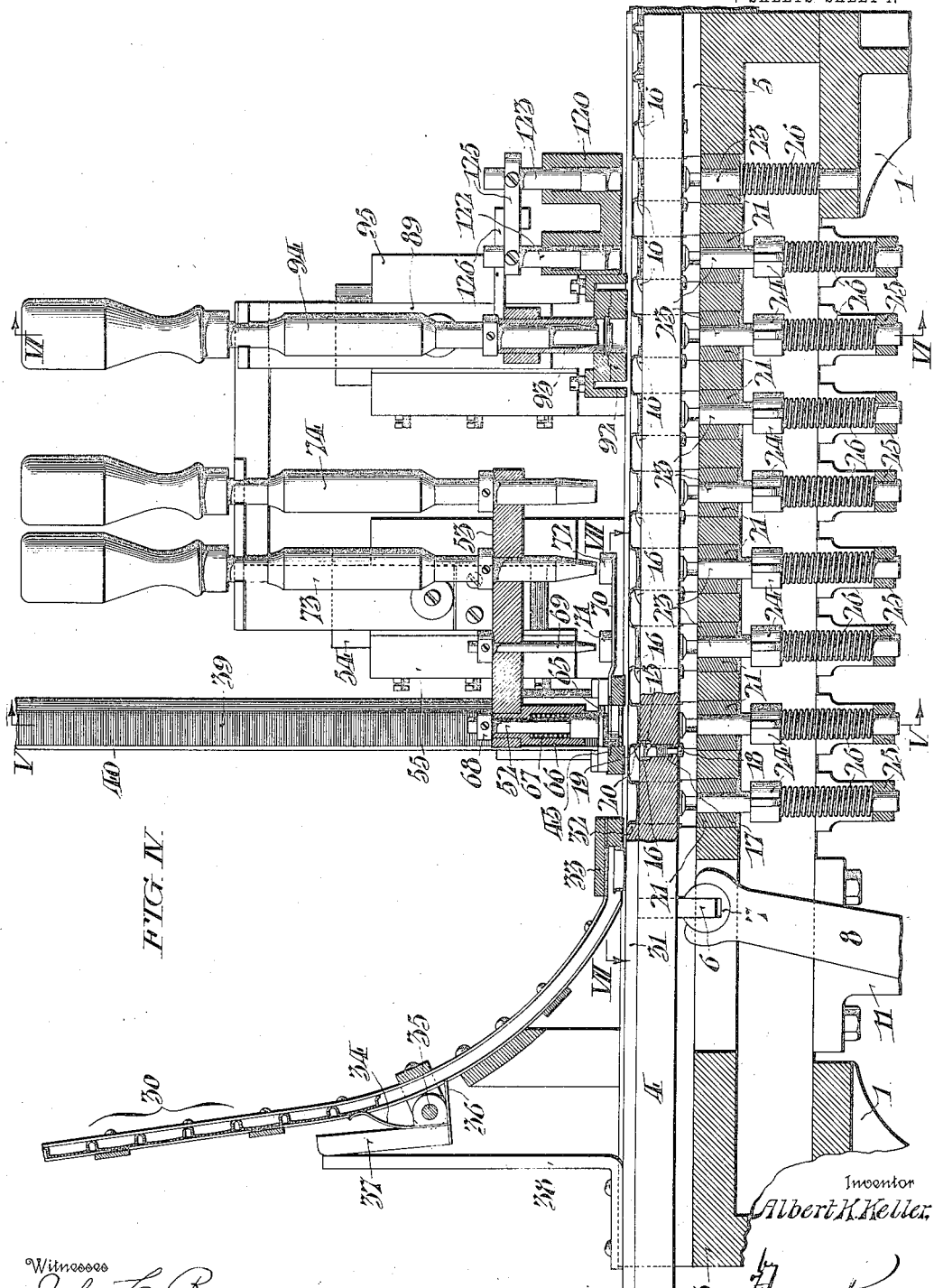

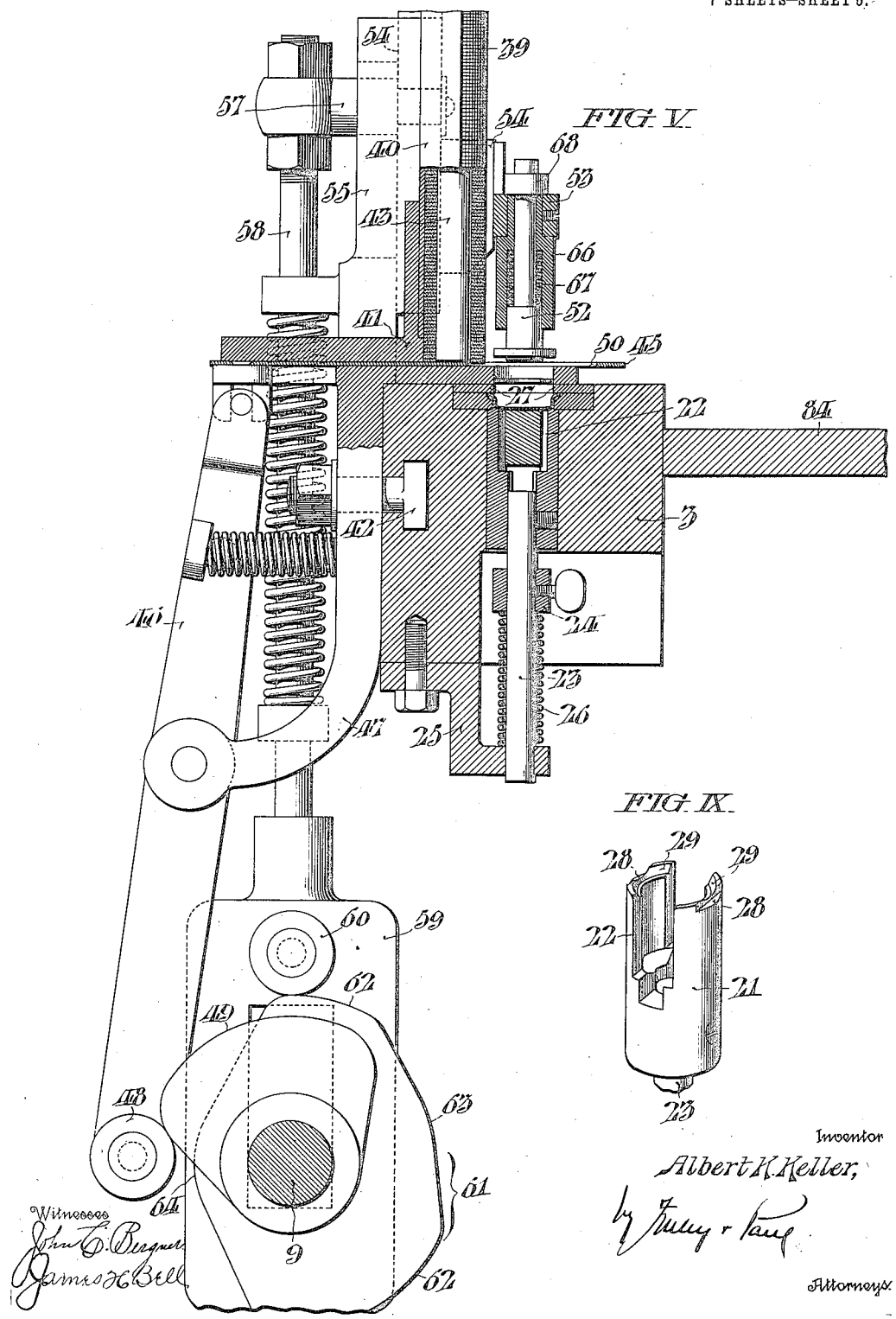

A. K. KELLER.
BOTTLE SEAL ASSEMBLING MACHINE.
APPLICATION FILED APR. 18, 1912.
1,081,505.
Patented Dec. 16, 1913.
7 SHEETS—SHEET 6.
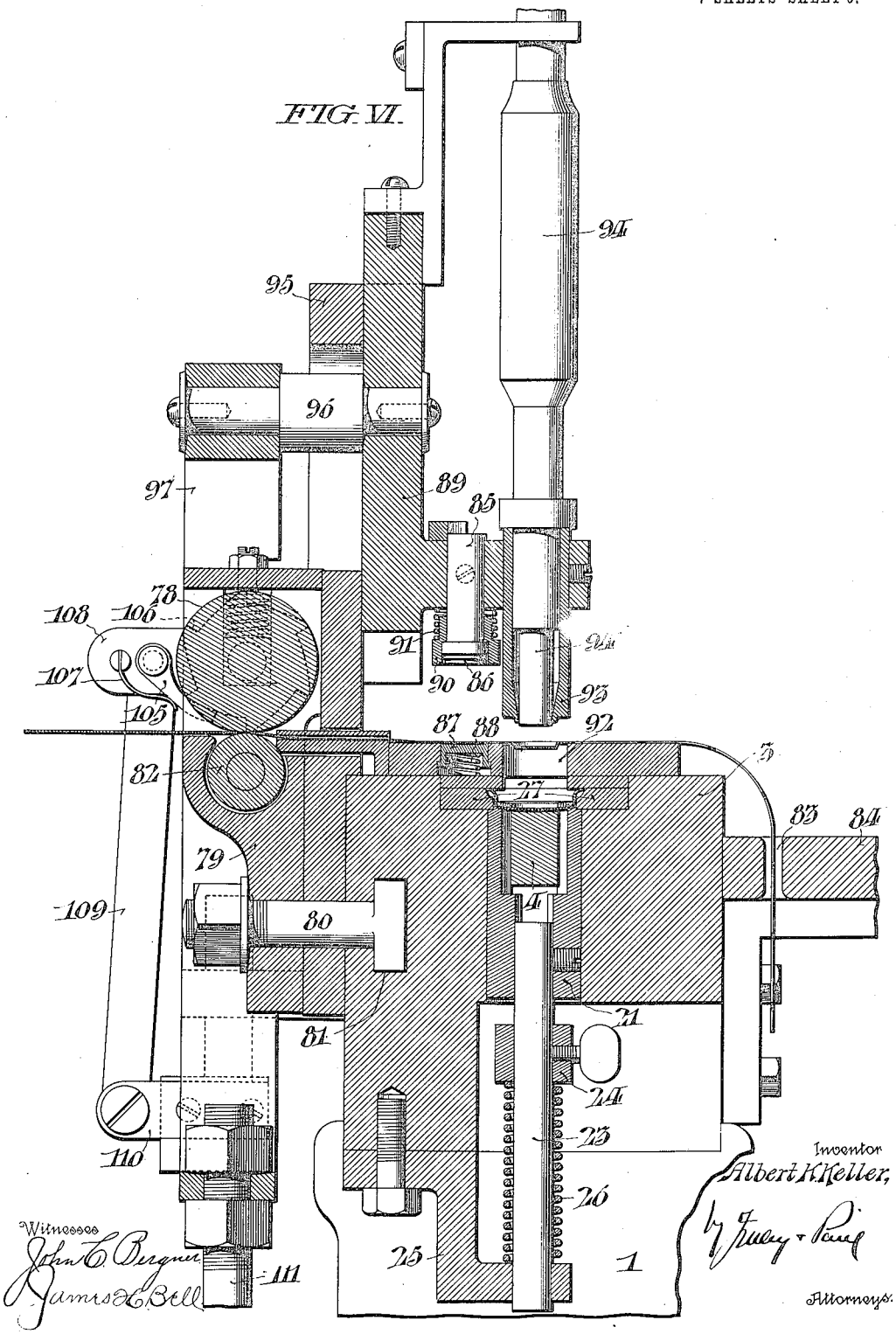
FIG. VI.

A. K. KELLER.
BOTTLE SEAL ASSEMBLING MACHINE.
APPLICATION FILED APR. 18, 1912.
1,081,505.
Patented Dec. 16, 1913.
7 SHEETS—SHEET 7.
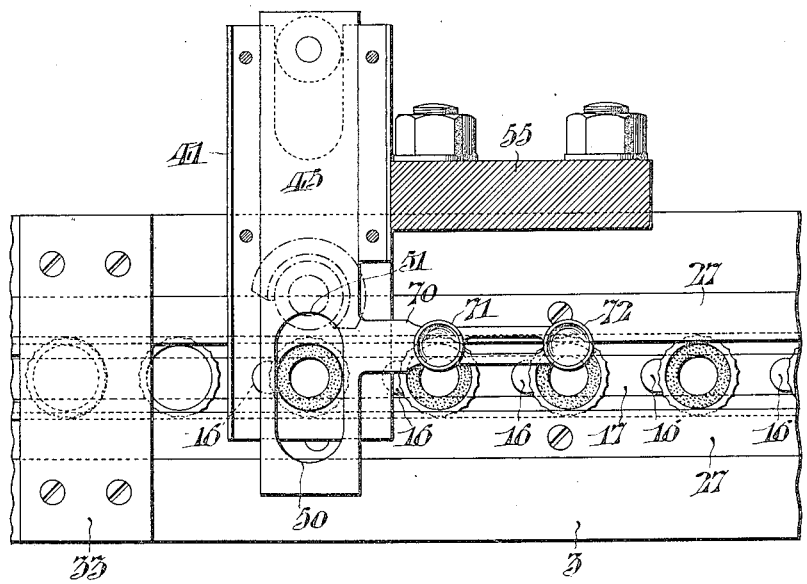
FIG VII.
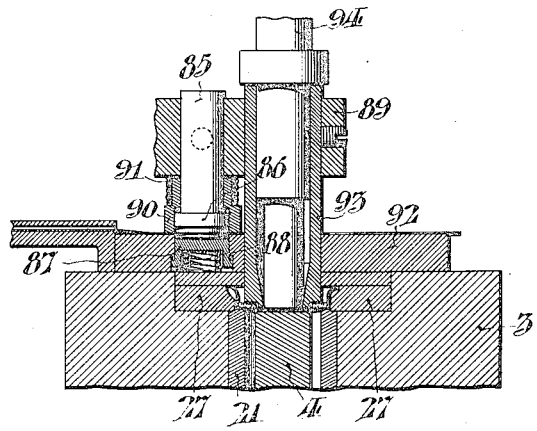
FIG VIII.

UNITED STATES PATENT OFFICE.

ALBERT K. KELLER, OF PHILADELPHIA, PENNSYLVANIA, ASSIGNOR TO AMERICAN CORK AND SEAL COMPANY, OF PHILADELPHIA, PENNSYLVANIA, A CORPORATION OF MAINE.

BOTTLE-SEAL-ASSEMBLING MACHINE.

1,081,505.      Specification of Letters Patent.      Patented Dec. 16, 1913.

Application filed April 18, 1912. Serial No. 691,642.

*To all whom it may concern:*

Be it known that I, ALBERT K. KELLER, of the city and county of Philadelphia and State of Pennsylvania, have invented certain new and useful Improvements in Bottle-Seal-Assembling Machines, whereof the following is a specification, reference being had to the accompanying drawings.

Bottle seal assembling machines have been made which include devices for placing a sealing gasket in a cap, and for securing the gasket to the cap by placing a retaining member therein, which retaining member is cemented to the cap.

An object of the present invention is to provide a machine of the above character, wherein the retaining member may be soldered to the metal cap.

A further object of the invention is to provide an assembling machine which consists of a plurality of stations for placing the gasket in the cap and securing a retaining member to the cap for holding the gasket in place, which machine includes devices for feeding the cap intermittently from one station to another, together with devices for holding the cap at each station during the operation thereon.

A further object of the invention is to provide means for supplying acid to a reciprocating acid applying plunger, and also to apply solder to a reciprocating soldering iron, which soldering iron and acid applying device are so timed as to contact with a cap placed underneath the same, for supplying and spreading solder on the cap, which is subsequently used in securing the retaining member to the cap.

A further object of the invention is to provide combined means for cutting out a retaining member and for applying the same to the cap, which applying means includes a heated iron which operates to solder the retaining member to the cap.

These and other objects will in part be obvious, and will in part be hereinafter more fully disclosed.

In the drawings which show by way of illustration one embodiment of the invention, Figure I, is a front elevation of a machine embodying my invention. Fig. II, is a rear elevation of a portion of a machine with certain of the parts in section. Fig. III, is a view of the right hand end of the machine, as viewed in Fig. I. Fig. IV, is a longitudinal sectional view along the line of the feed bar, a portion of the feed bar being shown in section, and is indicated at IV, IV in Fig. III. Fig. V, is a transverse section on the line V, V, of Fig. IV. Fig. VI, is a transverse section on the line VI, VI, of Fig. IV. Fig. VII, is a sectional view on the line VII, VII, of Fig. IV. Fig. VIII, is a detail in section, similar to parts of Fig. VI, showing the retaining member applied to the cap. Fig. IX, is a perspective view of the cap holding chuck.

The invention consists generally of a supporting frame on which is mounted a reciprocating feed bar, which feed bar operates to convey the caps through the machine from one station to another, where the cap is successively operated upon to place therein a sealing gasket, and a retaining member therefor. A chuck is located at each station for receiving and holding the cap during all operations thereon. At the first station the gasket is placed over the cap and is forced into the same. At the second station, acid is applied to the metal of the cap at the center thereof. At the next station a drop of solder is applied to the cap. At the fourth station, the solder is spread on the cap. As herein shown, the next station is an idle station. At the following station a retaining member is formed and applied to the cap, and the solder is heated so as to secure the retaining member to the cap. At the next two stations, as herein shown, plungers are applied to the retaining member for the purpose of pressing the same against the cap, and for the purpose of assisting in cooling the solder.

Referring more in detail to the drawings, the machine consists of a supporting frame, which is formed of side standards 1, 1, and a connecting bar 2. At the upper end of the standards is a supporting table 3, in which is reciprocated a feed bar 4 (see Fig. IV). The table 3, is provided with a centrally arranged slot 5, which extends longitudinally of the table throughout the length thereof. The feed bar 4, is rectangular in cross section, as shown in Figs. V and VI. The feed bar carries a downwardly projecting pin 6, which loosely engages a ball 7, in the upper end of a lever 8. Extending longitudinally of the frame is a driving shaft 9. The lever 8, is fulcrumed at 10, to a bracket 11, carried by the under face of the table 3. A cylinder 12, having a cam groove 13, therein, is mounted on the driving shaft and the lever 8, is provided with a roll 14, which co-ooperates with the walls of the cam groove 13.

As the driving shaft rotates, the feed bar will be reciprocated back and forth through the oscillations of the operating lever 8. The feed bar is provided with a plurality of spaced sockets 15. In each socket is located a yielding stop 16. This stop is normally spring-pressed upward by a spring 17. A screw 18, limits the upward movement of the stop. This stop is formed with a head having a square shoulder 19, on one face thereof, and a rounded face or shoulder 20, which extends from the shoulder 19, to the outer face of the other side of the stop. The purpose of this stop is to feed the caps along the table. When the shouldered face of the stop engages the cap, the cap will be moved therewith, while the tapered face of the stop will move underneath the cap and allow the bar to be retracted without moving the cap rearward therewith. As a means for holding the caps at each station, I have provided a supporting chuck 21, which is shown in detail in Fig. IX. This chuck consists of a cylindrical portion through which is cut a groove 22. The groove 22, is adapted to receive the feed bar and allow the feed bar to move freely through the same, as clearly shown in Figs. V, and VI. This chuck is mounted on the upper end of a stem 23. A collar 24, is carried by the stem. The lower end of the stem passes through an opening in a bracket 25, carried by the table 3. A spring 26, encircles the stem 23, and bears at one end against the collar 24, and at the other end against the bracket 25. This spring normally holds the chuck pressed upward.

The table is cut away at the top, and is provided with side plates 27. These side plates slightly overlap the opening formed in the table for the chuck 21, and said side plates engage stop shoulders 28, formed on the chuck. It will be understood that there is a chuck for each operating station, also a chuck for receiving the caps from the feed chute, and a chuck intermediate the solder applying station and the retainer applying station. In other words, the chucks are necessarily spaced a distance apart equal substantially to the length of reciprocation of feed stroke of the feed bar so that the caps are carried by the stops on the feed bar from one chuck to another, through the machine, the stops yielding to allow the feed bar to be retracted and the caps held by the chucks. Each chuck at its upper end is formed with tapered shoulders 29, which are adapted to receive the cap, and these shoulders form a pocket or seat in the chuck for the cap. The tapered shoulders will serve to center the cap at the operating station.

The caps are fed to the feed bar from a chute 30. This chute may be supplied in any desired way with the caps and is so positioned relative to the feed bar that when a cap is discharged therefrom, it will rest on the upper face of the feed bar. The feed bar at a point adjacent the point of receiving the caps is provided with a raised part 31, forming a shoulder 32. A housing 33, is located on the table at the lower end of the feed chute. A cap sliding down the feed chute will strike against the housing, and as the feed bar is retracted, said cap will fall on to the feed bar in front of the shoulder 32, so that when the feed bar moves forward, the cap will be carried to the first chuck, where it will be held by the chuck when the feed bar is retracted. On the next reciprocation of the feed bar, the first stop will slide underneath the cap, the spring for the stop yielding to allow the stop to slide underneath the same. As soon as the stop passes the cap, the spring will raise the stop so that the shoulder 19, of the stop will engage the cap on the next forward movement of the feed bar, and carry the cap to the next chuck. The caps are held supported in the feed chute by a retaining finger 34. This retaining finger is mounted on a rock shaft 35, which carries a second retaining finger 36. The shaft also carries an arm 37, which is positioned so as to contact with a bracket 38, which is rigidly fastened to the feed bar. When the feed bar moves forward, the bracket 38, striking the arm 37, will turn the rock shaft so as to cause the retaining finger 34, to engage a cap and support the caps in the feed chute while the cap beneath the one engaged by the retaining finger 34, will be released so that the same may pass down the chute to the housing 33, on the supporting table.

When the feed bar is retracted or moved in the opposite direction, the retaining finger 36, by gravity movement of the arm 37, will be moved across the passage in the chute and will sustain the column of caps. At the first station, the sealing gasket is applied to the cap. The sealing gaskets 39, as herein shown, are formed of cork and are disk-shaped, having a central opening therethrough. These caps are placed in a stack holder 40. The stack holder 40, is carried by a bracket 41, which is secured to the table by a T-head bolt 42, which may be adjusted in a T-slot in the rear of the table. The stack holder is open at the front side so that the gaskets are at all times accessible to the operator. A rod 43, extends centrally through the gaskets and is supported by the upper end of the chute, as clearly shown in Fig. I. A weight 44, freely slides on the rod and normally holds the gaskets pressed against the table at the lower end of the chute. A feed slide 45, moves underneath the stack holder and is adapted to engage one gasket at a time and carry the same into position to be applied to the cap. This stack holder is directly in rear of the second chuck, and the feed slide moves in a direction transversely of the table, so that the gasket as it is carried forward, will be moved over the cap held by the second chuck. The feed slide 45, is reciprocated back and forth by a lever 46, which is pivoted to an arm 47, carried by the bracket 41. The lever at its lower end carries a roller 48, which coöperates with a cam 49, on the main shaft 9. This cam is so shaped as to move the feed slide forward and to give a dwell thereto at the forward end of its stroke and then to move the slide to the rear end of its stroke, where it is also given a short dwell. The feed slide, as clearly shown in Fig. VII, extends entirely across the feed bar and is formed with an oblong slot 50, which is shaped to receive the sealing gaskets, and the inner edge 51, of the opening engages the gaskets and carries the same forward over the cap. The gasket is carried into the cap by a plunger 52. This plunger is mounted on a cross head 53, which is secured to a slide 54. The slide 54, is mounted for vertical movement in the supporting bracket 55. Said bracket is provided with a slot 56, and a lug 57, carried by the slide 54, extends through said slot.

A rod 58, is secured to the lug 57, and is adapted to reciprocate in suitable bearings carried by the bracket 55. The lower end of the rod is formed with a slotted head 59, which engages the main shaft 9, and the rod is thus guided in its vertical movements by said main shaft. A roller 60, carried by the slotted head 59, coöperates with a cam 61, on the main shaft 9. This cam 61, is constructed with two high portions 62, and two lower cam portions 63, and 64. It will be apparent from this construction, that the slide with the plunger 52, will be raised by the portion 62, to its extreme upper position, and will be lowered to its extreme lower position by the portion 64, and to an intermittent position by the portion 63. The purpose of this full and part stroke of the slide will be apparent when the acid-applying and solder-applying devices are described. This forward movement of the slide causes the plunger 52, which is formed with a head 65, to engage a gasket fed underneath the same by the feed slide 45, and carry the gasket down into the opening in the table directly above the second chuck. The plunger 52, is mounted in a barrel 66, and is spring-pressed downward by a spring 67. A collar 68, limits the downward movement of the plunger. This yielding movement of the plunger allows for any irregularities in the thickness of the cap, so that the gaskets will be seated in the cap with a yielding pressure. The first or part stroke of the plunger carries the gaskets to the position shown in Fig. V, while the second or full stroke of the plunger carries the gasket into the cap.

After the gasket has been placed in the cap, the cap is conveyed by the feed bar to the next chuck, where the acid is applied to the cap. This is accomplished by the acid-applying rod 69, which is carried by the cross-head 53. This rod will, therefore, reciprocate with the cross-head and will be given a part stroke and a full stroke in the same manner as said cross-head imparts movements to the plunger 52. The feed slide 45, is formed with a laterally projecting arm 70, which carries an acid cup 71. This arm is also provided with a solder cup 72. A soldering iron 73, which as is herein shown, is of the usual electrically heated hand type, is also adapted to be mounted in the cross-head 53. The slide 54, is provided with a support for the upper end of the soldering iron. A second electrically heated spreading iron 74, is mounted in the cross-head 53. These two soldering irons 73, and 74, will move up and down with the cross-head in the same manner as the acid-applying rod 69. The movement of the feed slide is so timed that on the part stroke of the cross-head, caused by the portion 63, of the cam 61, the feed slide is at the forward end of its stroke, and the acid cup and solder cup are consequently underneath the acid-applying rod and the soldering iron. This part stroke of the cross-head will cause the acid-applying rod to dip into the acid, and will also cause the soldering iron to dip into the solder in the soldering cup. As the cross-head is raised, a drop of solder and also a drop of acid will be held on the end of the soldering iron, and acid-applying rod, respectively. On the next down stroke of the cross head, which is a full stroke, the acid-applying rod will be carried down into contact with the inner face of the cap, and acid will be thereby applied to the cap. On this same stroke, the soldering iron will be carried down into contact with the cap located in the next succeeding chuck, and a drop of solder will be applied to the acid treated surface of the cap. On this stroke the spreading iron will also engage the solder in the cap carried by the chuck underneath the same. It will be understood that while the plunger, the acid-applying rod, and the soldering iron operate simultaneously, that each of these elements are operating upon a separate cap held by the chuck underneath the same. After the solder has been applied to the cap, the cap is moved forward another step to a holding chuck, which, as herein shown, is an idle station. From this idle station, the cap is carried to a station where the retaining member is applied to the cap. This retaining member consists of a disk of thin metal which is crowned so as to feed or enter the center opening in the sealing gasket, and is also provided with a flange which overlaps the gasket so that when the retaining member is soldered to the cap, the gasket will be securely held by said retaining member.

The retaining member is constructed and applied to the cap in the following manner: A sheet of metal from which the retaining members may be made, is wound on a spool 75, (see Fig. III) which is mounted in a bracket arm 76, carried by the supporting table. The strip of metal passes underneath tension rolls 77, and is led across the table in a direction at right angles to the line of reciprocation of the feed bar. A feeding roller 78, is yieldingly mounted on a supporting bracket 79, which is secured to the table 3, by a T-head bolt 80, which is adjustable in a T-slot 81, extending longitudinally of the table. Coöperating with the roll 78, is a roll 82. The strip of metal passes between said rolls and is led through a suitable opening in the bracket across the table, and the waste metal in the strip passes over the front of the table down through an opening 83, in the bracket 84, at the forward side of the machine. The strip is first shaped so as to form a center projection adapted to fit within the central opening in the sealing gasket. This is accomplished by a plunger 85, (see Fig. VI). The plunger 85, is formed with a shaping head 86, and coöperating with the plunger is a yielding anvil 87. This anvil is mounted in the table, and is spring-pressed upwardly by a spring 88. The plunger or shaping die 85, is carried by a reciprocating cross-head 89. A sleeve 90, surrounds the stem of the die or plunger, and is held normally spring-pressed downward by a spring 91. The purpose of this collar is to strip the metal from the die, when the die is lifted from the metal strip.

When the cross-head 89, is reciprocated, the shaping die engages the strip and the anvil yields to allow the center portion to be projected by the die in the manner clearly shown in Fig. VIII. Upon the retracting of the die, the sleeve 90, will push the strip from the die and the anvil will lift the strip so that it may be moved forward directly over the chuck carrying the cap. The retaining member is cut from the strip by a cutting die 92. This cutting die coöperates with a male die member 93. This die is carried by the cross-head 89, and as the cross-head moves downward, the die will engage the strip and sever the retaining member therefrom, and the further downward movement of the die will carry said retaining member into engagement with the cap supported by the chuck underneath the same. This die 92, as shown in Fig. VI, is formed with a central opening therethrough. An electrically heated iron 94, is supported by the die member 93, and projects slightly beneath the end thereof.

When the die moves down so as to cut the retaining member from the strip, the heated iron will move with the die, and will engage the retaining member. When the retaining member is carried into the cap, the heated iron will be brought against the upper surface of the retaining member, and the heat of the iron will melt the solder on the cap, and cause the cap and retaining member to be firmly attached or soldered together. The cross-head 89, slides in suitable guides in a bracket 95. Said cross-head carries a stud 96, which stud is secured to the upper end of a yoke 97 (see Fig. II). The yoke 97, at its lower end, is attached to a rod 98, which is provided with a slotted head 99, which engages and is guided by the main shaft 9. Said slotted head carries a roller 100, which coöperates with a cam 101, on the main shaft. The lower end of the slotted head is connected to a rod 102, which reciprocates in the bar 2, carried by the frame. A spring 103, is located between the bar and a collar 104, on said rod 102. This spring normally presses the roller 100, into engagement with the cam 101, and holds the cross head raised. The cam operates to move the cross-head positively downward, so as to cause the shaping die and cutting die to operate upon the strip.

The feeding roll 78, for the strip of metal is intermittently rotated by a pawl 105, which engages ratchet teeth 106, carried by the feed roll 78. A spring 107, normally presses the pawl into engagement with the teeth of the ratchet. This pawl and the spring are mounted on an arm 108, which is pivoted concentrically of the roll and is oscillated by a link 109, which is pivoted to an arm 110, carried by the upper end of a rod 111. The rod 111, is mounted to reciprocate in a suitable bearing at the upper end, and in the cross bar 2, at its lower end. This rod carries a slotted head 112, in which is mounted a roller 113, which coöperates with a cam 114. A spring 115, bearing against the cross bar 2, and the collar 116, normally holds the rod 111, raised. The cams 114, and 101, are so timed that the feed roller is rotated to feed the strip beneath the shaping die and cutting die when the cross head 89, is raised.

Mounted in a bracket 120, secured to the table 3, by a bolt 121, are two cooling irons or plungers 122, and 123. These cooling irons are cylindrical in shape, and are adapted to enter the cap and press the retaining member and gasket against the cap. These irons not only press the parts into engagement while the solder is cooling, but through contact with the metal will aid in conducting the heat away from the metal, and cooling the same. Said plungers are so spaced as to operate upon the caps retained by successive chucks. The plungers are united by a cross piece 125, and are adapted to drop into the caps under the influence of gravity. They are raised by means of a finger 126, which engages the under surface of the cross piece 125. The finger 126, is secured to the cross head 89, already mentioned. The caps after having the retainer secured thereto, are fed through the machine through the reciprocating movements of the feed bar.

The main shaft 9, carries a gear wheel 130, which meshes with a pinion 131, on a counter-shaft 132, mounted in the frame, and in a bracket arm 133. A combined friction clutch and driving pulley 134, is carried by the counter-shaft. Said clutch is controlled by a sliding collar 135, and an arm 136, which is carried by a rod 137. The rod 137, is secured to a lever 138, which is provided with a hand grip 139, positioned for easy access by the operator. A supporting bar or frame 140, is carried by the main table, and serves as a means on which the irons may be hung when removed from the machine, or from other places. The temperature of each iron is controlled by a separate electric rheostat 141. The operation of my device will be apparent from the above description. The caps are placed in the feed chutes and are fed one at a time to the feed bar which, as it reciprocates, conveys the caps from one chuck to another until the caps are presented to each one of the different operating stations. The sealing gaskets are fed one at a time above the caps at the gasket-applying station, and the gaskets are seated in the caps by a reciprocating plunger. At the next station acid is applied to the cap, after which solder is applied and spread on the cap, and then the cap is conveyed to the station where the retaining member is formed, shaped, and cut, and at this station the retaining member is placed in the cap and soldered thereto.

After the retaining member is attached to the cap, it is pressed against the cap and the parts cooled by the plungers operating thereupon.

It is obvious that minor changes in the details of construction and arrangement of parts may be made, without departing from the spirit of the invention as set forth in the appended claims.

Having thus described my invention, I claim:

1. In a machine of the class described, the combination of means for placing a sealing gasket in a cap; devices for applying solder to the cap; devices for forming and applying a retainer to the cap, and for soldering the same thereto.

2. In a machine of the class described, the combination of means for placing a sealing gasket in a cap; means for subsequently applying solder to the cap; means for forming and cutting a retainer and for placing the same in the cap; and means for heating the solder to secure the retainer to the cap.

3. In a machine of the class described, the combination with means for applying a gasket to a cap; devices for applying solder to the cap; devices for forming and applying a retainer to the cap and soldering the same thereto; and means for successively presenting a cap to the gasket-applying means, the solder-applying devices and the retainer forming and applying devices.

4. In a machine of the class described, the combination with means for applying a gasket to a cap; devices for applying solder to the cap; devices for forming and applying a retainer to the cap and soldering the same thereto; and means for successively presenting a cap to the gasket-applying means, the solder-applying devices, and the retainer forming and applying devices, said presenting means including a reciprocating bar and yielding stops carried thereby.

5. In a machine of the class described, the combination with means for applying a gasket to a cap; devices for applying solder to the cap; devices for forming and applying a retainer to the cap and soldering the same thereto; means for successively presenting a cap to the gasket-applying means, the solder-applying devices, and the retainer forming and applying devices, said presenting means including a reciprocating bar and yielding stops carried thereby, and yielding chucks for holding the caps from rearward movement with the feed bar.

6. In a machine of the class described, the combination of a gasket-applying station; a solder-applying station and a retainer forming and applying station; and means for feeding caps successively to said stations, said means including a reciprocating bar; stops carried thereby; and a yielding chuck located at each station for receiving and holding the cap.

7. In a machine of the class described, the combination of a gasket-applying station; a solder-applying station; and a retainer forming and applying station; and means for feeding caps successively to said stations, said means including a reciprocating bar for positively moving the caps from one station to another; yielding chucks at each station for holding the caps, said chucks including means for centering the caps at the stations.

8. In a machine of the class described, the combination of a gasket-applying station; a solder-applying station and a retainer forming and applying station, and means for feeding caps successively to said stations, said means including a feed bar; means for reciprocating the feed bar; yielding stops carried by the feed bar for positively engaging and moving the caps from one station to another; and a yielding chuck at each station for engaging and holding the cap.

9. In a machine of the class described, the combination of a gasket-applying station; a solder-applying station and a retainer forming and applying station, and means for feeding caps successively to said stations, said means including a feed bar; means for reciprocating the feed bar, yielding stops carried by the feed bar for positively engaging and moving the caps from one station to another; and a yielding chuck at each station for engaging and holding the cap, said yielding chuck having means for engaging and centering the cap at the station.

10. In a machine of the class described, the combination of a gasket-applying station; a soldering station; a retainer forming and applying station; a reciprocating feed bar; a yielding chuck located at each station, each of said chucks having a slot formed therein, in which said bar reciprocates; springs for normally pressing said chucks upward, and stops for limiting the upward movement of the chucks.

11. In a machine of the class described, the combination of a gasket-applying station; a soldering station; a retainer forming and applying station; a reciprocating feed bar; a yielding chuck located at each station; each of said chucks having a slot formed therein, in which said bar reciprocates; springs for normally pressing said chucks upward, and stops for limiting the upward movement of the chucks, said feed bar having a plurality of yielding stops adapted to engage the caps and positively carry the same from one chuck to another.

12. In a machine of the class described, the combination of a feed bar for feeding caps step by step through the machine; means for applying a gasket to the cap, including a gasket stack holder; a reciprocating feed slide; a plunger for engaging the gaskets and placing the same in the caps; an acid applying rod, and a soldering iron; and means for simultaneously reciprocating said plunger, said rod, and said iron.

13. In a machine of the class described, the combination of means for feeding caps; means for applying a gasket thereto; and means for applying solder to the cap, including an acid-applying rod; a soldering iron; an acid cup; a solder cup; and means for causing said acid-applying rod and said soldering iron to dip into said cups prior to the engagement of the caps by the acid rod and soldering iron.

14. In a machine of the class described, the combination of means for feeding caps; means for applying a gasket thereto; and means for applying solder to the cap including a soldering iron; a solder cup; means for giving said iron a long and short reciprocation; and means for moving the solder cup underneath said iron at said short reciprocation.

15. In a machine of the class described, the combination of a frame; a table supported by said frame and having a longitudinal groove therein; a cap feeding bar reciprocating in said groove; means for reciprocating said bar; means carried by said bar for positively feeding caps step by step along said table; a yielding chuck for engaging and holding the caps; a gasket-applying means for inserting a gasket in a cap, an acid-applying rod for applying acid to a cap, a soldering iron for applying solder to the cap, a spreading iron for spreading the solder on the cap, a forming die, and a cutting die for forming and placing a retainer in the cap; and a soldering iron for heating the solder to secure the retainer to the cap.

16. In a machine of the class described, the combination of a frame; a table supported by said frame and having a longitudinal groove therein; a cap feeding bar reciprocating in said groove; means for reciprocating said bar; means carried by said bar for positively feeding caps step by step along said table; a yielding chuck for engaging and holding the caps; a gasket-applying means for inserting a gasket in a cap; an acid-applying rod for applying acid to a cap; a soldering iron for applying solder to the cap; a spreading iron for spreading the solder on the cap; a forming die, and a cutting die for forming and placing a retainer in the cap; a soldering iron for heating the solder to secure the retainer to the cap; and reciprocating plungers for engaging the retainer for pressing the same against the cap after the same is soldered thereto.

17. In a machine of the class described, the combination of means for placing a sealing gasket in a cap, means for subsequently applying solder within the cap, means for forming and cutting a retainer and placing the same in the cap, and means for heating the solder to secure the retainer to the cap.

In testimony whereof, I have hereunto signed my name at Philadelphia, Pennsylvania, this eighth day of April 1912.

ALBERT K. KELLER.

Witnesses:
JAMES H. BELL,
E. L. FULLERTON.